United States Patent
Conners et al.

(10) Patent No.: US 9,878,778 B2
(45) Date of Patent: Jan. 30, 2018

(54) SYSTEM AND METHOD FOR CONTROLLING A PRESSURE FIELD AROUND AN AIRCRAFT IN FLIGHT

(71) Applicant: Gulfstream Aerospace Corporation, Savannah, GA (US)

(72) Inventors: Timothy Conners, Savannah, GA (US); Michael Knight, Savannah, GA (US); Robert Cowart, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 682 days.

(21) Appl. No.: 14/459,488

(22) Filed: Aug. 14, 2014

(65) Prior Publication Data

US 2016/0257397 A1 Sep. 8, 2016

(51) Int. Cl.

| | | |
|---|---|---|
| *B64C 13/16* | (2006.01) | |
| *B64C 9/04* | (2006.01) | |
| *B64C 23/04* | (2006.01) | |
| *B64D 31/06* | (2006.01) | |
| *B64D 33/02* | (2006.01) | |
| *F02C 9/28* | (2006.01) | |
| *B64C 30/00* | (2006.01) | |
| *G01L 19/00* | (2006.01) | |
| *G01L 19/14* | (2006.01) | |

(52) U.S. Cl.
CPC .............. *B64C 23/04* (2013.01); *B64C 13/16* (2013.01); *B64C 30/00* (2013.01); *B64D 31/06* (2013.01); *B64D 33/02* (2013.01); *F02C 9/28* (2013.01); *G01L 19/0084* (2013.01); *G01L 19/14* (2013.01)

(58) Field of Classification Search
CPC ......... B64C 13/16; B64C 23/065; B64C 9/04; B64C 23/005; G01H 17/00; G01S 17/58; G05D 1/0607; F41G 3/147; B64D 43/02; G07F 17/3227
See application file for complete search history.

(56) References Cited

U.S. PATENT DOCUMENTS

| | | | | |
|---|---|---|---|---|
| 3,056,566 A | * | 10/1962 | Davidson | ............... B64C 23/005 244/15 |
| 3,221,549 A | * | 12/1965 | Wetmore | ............... B64D 43/02 235/61 NV |
| 4,114,842 A | * | 9/1978 | Hofferber | ............ G05D 1/0066 244/180 |

(Continued)

*Primary Examiner* — Yuri Kan
(74) *Attorney, Agent, or Firm* — LKGlobal | Lorenz & Kopf, LLP

(57) ABSTRACT

A system for controlling a pressure field around an aircraft in flight is disclosed herein. In a non-limiting embodiment, the system includes, but is not limited to, a plurality of pressure sensors that are arranged on the aircraft to measure the pressure field. The system further includes, but is not limited to, a controller that is communicatively coupled with the plurality of pressure sensors. The controller is configured to receive information that is indicative of the pressure field from the plurality of pressure sensors. The controller is also configured to determine when the pressure field deviates from a desired pressure field based on the information. The controller is also configured to transmit an instruction to a movable component onboard the aircraft that will cause the movable component to move in a manner that reduces the deviation.

17 Claims, 7 Drawing Sheets

(56) References Cited

U.S. PATENT DOCUMENTS

| | | | | |
|---|---|---|---|---|
| 6,905,091 | B2 * | 6/2005 | Berson | B64C 30/00 244/1 N |
| 9,334,807 | B2 * | 5/2016 | deGaribody | G01S 17/58 |
| 2012/0178523 | A1 * | 7/2012 | Greenberg | G07F 17/3227 463/25 |
| 2012/0307595 | A1 * | 12/2012 | Barger | F41G 3/147 367/127 |
| 2014/0291453 | A1 * | 10/2014 | Sankrithi | B64C 23/065 244/199.4 |
| 2016/0161949 | A1 * | 6/2016 | Lam | B64C 9/04 701/7 |

\* cited by examiner

SYSTEM AND METHOD FOR CONTROLLING A PRESSURE FIELD AROUND AN AIRCRAFT IN FLIGHT

TECHNICAL FIELD

The present invention generally relates to aircraft and more particularly relates to systems and methods for controlling a pressure field around an aircraft in flight.

BACKGROUND

A quiet supersonic aircraft is a supersonic aircraft that will be able to comply with applicable governmental restrictions on the magnitude of sonic booms for flight over land or over other restricted areas, when such restrictions are set. Quiet supersonic aircraft will be designed to comply with such governmental restrictions when flying at a predetermined supersonic speed (e.g., Mach 1.7) and at predetermined atmospheric conditions (e.g., standard atmospheric conditions) and at predetermined operating conditions (e.g., throttle settings, angle of attack). When flying at the predetermined speed and the predetermined operating conditions through the predetermined atmospheric conditions, a quiet supersonic aircraft will have a pressure field around the aircraft that is substantially free from steep pressure gradients. As used herein, the phrase "steep pressure gradient" refers to a relatively large change in pressure over a relatively short distance.

A pressure field free of steep pressure gradients, when propagated to the ground, can give rise to a sonic boom having a magnitude that falls below governmentally imposed limits. Any deviation from the predetermined supersonic speed or from the predetermined atmospheric conditions or from the predetermined operating conditions may give rise to a steep pressure gradient in the pressure field. If a steep pressure gradient were to form in the pressure field around the aircraft during supersonic flight, this could have an undesirable effect on the magnitude of the sonic boom that propagates to the ground.

The propulsion system of a supersonic aircraft interacts aerodynamically with the airframe and with the pressure field around the supersonic aircraft. For example, the flow of air ingested by the propulsion system's inlet, the cycle at which the propulsion system's engine is operated, or the exhaust plume expelled by the propulsion system's nozzle will interact with the airflow around the supersonic aircraft's airframe. A quiet supersonic aircraft is designed such that when the propulsion system is operating at its design condition, the effect of the propulsion system on the pressure field will not give rise to a relatively steep gradient in the pressure field. As used herein, a reference to the design condition of a propulsion system refers to the predetermined engine cycle, the predetermined Mach speed, the predetermined atmospheric conditions, and the predetermined throttle settings that the engine will be operating at when the aircraft is operating at its design condition.

However, when operation of the propulsion system deviates from the design condition (e.g., throttle settings that deviate from design throttle settings, operation at speeds other than design Mach speed, operation of the engine at an engine cycle that differs from a design engine cycle, operation of the propulsion system in other than the predetermined atmospheric conditions, etc.), the propulsion system can cause a relatively steep gradient to form in the pressure field around the aircraft. This is undesirable.

Accordingly, it is desirable to provide a system that can control the pressure field around an aircraft in flight. In addition, it is desirable to provide a method for controlling the pressure field around an aircraft in flight. Furthermore, other desirable features and characteristics will become apparent from the subsequent summary and detailed description and the appended claims, taken in conjunction with the accompanying drawings and the foregoing technical field and background.

BRIEF SUMMARY

Various embodiments of a system and a method for controlling a pressure field around an aircraft in flight are disclosed herein.

In a first non-limiting embodiment, the system includes, but is not limited to, a plurality of pressure sensors arranged on the aircraft to measure the pressure field. The system further includes, but is not limited to, a controller that is communicatively coupled with the plurality of pressure sensors. The controller is configured to receive information that is indicative of the pressure field from the plurality of pressure sensors, to determine when the pressure field deviates from a desired pressure field based on the information, and to transmit an instruction to a movable component onboard the aircraft that will cause the movable component to move in a manner that reduces the deviation.

In another non-limiting embodiment, the system includes, but is not limited to, a plurality of pressure sensors arranged on the aircraft. Each pressure sensor of the plurality of pressure sensors is positioned to measure a respective air pressure proximate a respective portion of an external surface of the aircraft proximate a propulsion system of the aircraft. The system further includes, but is not limited to, a first movable component that is mounted on the aircraft and that is disposed in a position that alters the pressure field when the first movable component moves while the aircraft is in flight. The system still further includes a controller that is communicatively coupled with the plurality of pressure sensors and that is communicatively connected with the first movable component. The controller is configured to receive information from each pressure sensor indicative of the respective air pressure, to compute a pressure field along the external surface of the aircraft based on the information, to detect a deviation between the pressure field and an anticipated pressure field caused by the propulsion system of the aircraft, and to send a first instruction to the first movable component to move in a manner that diminishes the deviation when the deviation is detected.

In yet another non-limiting embodiment, the method includes, but is not limited to measuring the pressure field with a plurality of pressure sensors arranged on the aircraft. The method further includes, but is not limited to receiving, at a controller, information from the plurality of pressure sensors that is indicative of the pressure field. The method further includes, but is not limited to determining, with the processor, when the pressure field deviates from a desired pressure field based, at least in part, on the information from the plurality of pressure sensors; and transmitting, with the processor, an instruction to a movable component onboard the aircraft that will cause the movable component to move in a manner that reduces the deviation.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

A system and method for controlling the pressure field around an aircraft in flight are disclosed herein. In an exemplary embodiment of the system, multiple pressure sensors are positioned at various locations on the aircraft and are situated to measure the pressure in the vicinity of corresponding portions of the aircraft's exterior. In some embodiments, the pressure sensors are configured to measure dynamic pressure. In other embodiments, the pressure sensors may be configured to measure static pressure, stagnation pressure, or combinations thereof. In some embodiments, the pressure sensors may be disposed and/or concentrated at positions proximate the aircraft's propulsion system to better measure the effect of the propulsion system on the pressure field around the aircraft.

A controller is communicatively coupled with the plurality of pressure sensors and is configured to receive the pressure readings from each pressure sensor. The controller compiles the pressure readings and determines the nature, parameters, gradients, and other measurable aspects of the pressure field around the aircraft. When the controller detects the presence or formation of a steep pressure gradient in the pressure field, the controller is configured to send an instruction to a movable component on the aircraft. The movable component is disposed in a location that permits it to interact with the air flowing over the exterior of the aircraft or flowing in, around, or through the aircraft's propulsion system. For example, the component may be associated with the aircraft's propulsion system such as an extendable compression surface or articulating fan blades of the engine's compressor. In other examples, the component may be one or more movable flight control surfaces positioned around the exterior of the aircraft. Movement of the movable component will have an impact on the pressure field. The controller will select a movable component that will have an effect on the pressure field that will reduce or offset entirely the steep pressure gradient detected by the controller.

A greater understanding of the system for controlling the pressure field around an aircraft described above and of the method for controlling the pressure field around an aircraft may be obtained through a review of the illustrations accompanying this application together with a review of the detailed description that follows.

Figure 1:
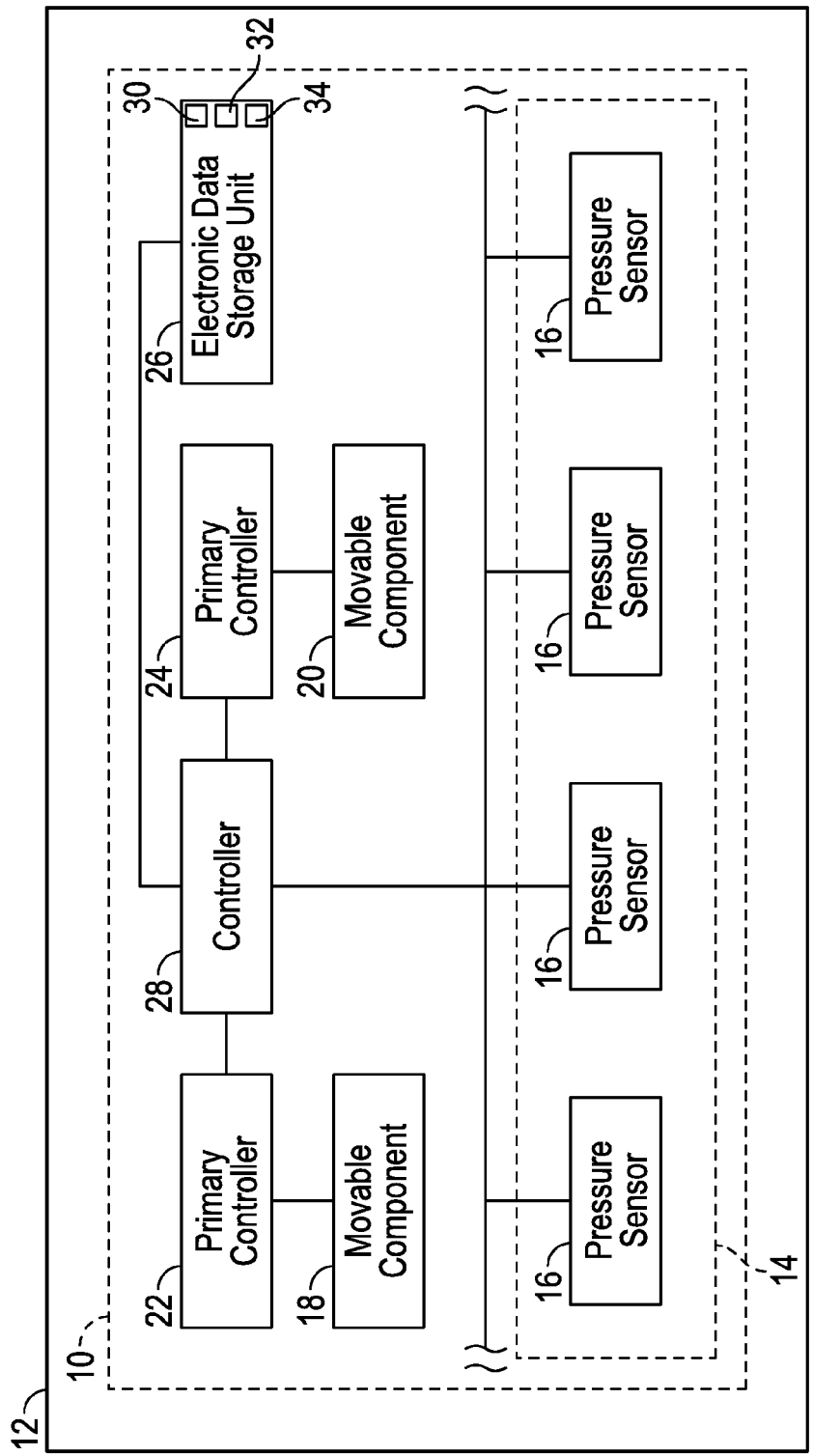
FIG. 1 is a block diagram illustrating a non-limiting embodiment of a system for controlling the pressure field around an aircraft in flight made in accordance with the teachings of the present disclosure.

FIG. 1 is a block diagram illustrating a non-limiting embodiment of a system 10 for controlling a pressure field around an aircraft 12. In the illustrated embodiment, system 10 includes a plurality 14 of pressure sensors 16. In FIG. 1, plurality 14 includes many pressure sensors 16, only four of which have been illustrated in FIG. 1 for ease of illustration. It should be understood that in other embodiments, plurality 14 may include either a greater or a lesser number of pressure sensors 16 without departing from the teachings of the present disclosure. The embodiment of system 10 illustrated in FIG. 1 further includes a movable component 18 and a movable component 20. In other embodiments of system 10, either a greater or lesser number of movable components may be included. System 10 further includes a primary controller 22 and a primary controller 24 associated with movable component 18 and movable component 20, respectively. System 10 further includes an electronic data storage unit 26 and a controller 28. In other embodiments, system 10 may include additional components or fewer components without departing from the teachings of the present disclosure.

Pressure sensors 16 may comprise any type of pressure sensor, whether now known or hereafter invented, that is configured to measure pressure. In some examples, pressure sensors 16 may be configured to measure static pressure, dynamic pressure, stagnation pressure, free stream pressure, ambient pressure, or combinations thereof. In the illustrated embodiment, pressure sensors 16 comprise conventional pressure taps that are directly exposed to the free stream of flowing air adjacent aircraft 12. In other embodiments, pressure sensors 16 may comprise optical pressure sensors such as those used in optical air data systems and that are configured to measure pressure through optical means (e.g., through the use of laser light), without direct contact with the free stream of flowing air proximate the exterior surface of the aircraft.

In the embodiment illustrated in FIGS. 2-6, each pressure sensor 16 comprises a pressure tap. Each pressure sensor 16 is mounted so that a portion of each pressure sensor is disposed on or just below the surface of aircraft 12 and is able to directly contact and sample the free stream of air flowing proximate the pressure sensor. Each pressure sensor 16 of plurality 14 is mounted at a known location with respect to the surface of aircraft 12 and is configured to take pressure readings in the vicinity of that known location. In some examples, each pressure sensor 16 may be configured to measure the pressure at a predetermined distance spaced apart from the surface of aircraft 12 (e.g., one foot, one meter, etc.).

As illustrated in FIG. 1, each pressure sensor 16 is communicatively coupled with controller 28. A direct hard-wired connection between each pressure sensor 16 and controller 28 is illustrated in FIG. 1. In other embodiments, such communicative coupling may be accomplished in any suitable manner including, but not limited to, the use of a communication bus, the use of wireless communications, and combinations thereof. Pressure sensors 16 are each configured to provide respective pressure readings to controller 28 that are indicative of the pressure conditions in their vicinity. Such pressure readings are delivered to controller 28 via the communicative coupling between each pressure sensor 16 and controller 28.

Movable components 18 and 20 may comprise any component on the aircraft that is both configured for movement and which will alter the pressure field around aircraft 12 when it moves. For example, the control surfaces (e.g., ailerons, rudder, flaps, slats, etc.) of aircraft 12 will each affect the pressure field around aircraft 12 when they move while aircraft 12 is in flight. Further, various components of the propulsion system of aircraft 12 will also affect the pressure field around aircraft 12 when they move. For example, changes to the engine cycle may impact the rate at which air enters and/or exits the propulsion system and therefore will affect the pressure field around aircraft 12. Movable/extendable inlet compression surfaces and nozzle surfaces will also impact the rate and conditions under which air enters the propulsion system and the rate and conditions at which air exits the propulsion system when they are moved/extended. Accordingly, movement of such extendable compression surfaces and nozzle plugs may affect the pressure field around aircraft 12. It should be understood that while Applicants have provided examples of movable components and of their effects on the pressure field around an aircraft in flight, the examples included above are not exhaustive. Other components may also be movable and have an effect on the pressure field around the aircraft and may serve as movable components 18 and 20.

Primary controller 22 and primary controller 24 may comprise any type of controller, processor, computer, or other arrangement of circuitry that is configured to issue commands to movable component 18 and movable component 20, respectively, that cause movable component 18 and movable component 20 to move and/or to alter the manner in which said component is moving. It should be understood that reference herein to the movement of a movable component not only refers to the movement of a component that is currently stationary, but may also refer to the cessation of movement of a movable component that is currently moving and the alteration of the movement of a component that currently is moving (e.g., changing the rate of movement or changing the length or extent of such movement). In an example, movable component 18 may comprise a gas turbine engine or a component thereof (e.g., a compressor) and primary controller 22 may comprise a Full Authority Digital Electronic Controller (FADEC) that is configured to control operation of the gas turbine engine. In another example, movable component 20 may comprise a flight control surface (e.g., an aileron, a rudder, a flap, a slat, etc.) and primary controller 24 may comprise a Flight Control Computer (FCC) that is configured to control movement of the flight control surface. By positioning primary controllers 22 and 24 between controller 28, on the one hand, and movable component 18 and 20, respectively, on the other hand, primary controllers 22 and 24 retain full authority over movable components 18 and 20. Arranged in this configuration, primary controllers 22 and 24 are able to evaluate whether to reject commands issued by controller 28 or whether to accept and transmit such commands to movable components 18 and 20, as discussed in greater detail below. In other embodiments, controller 28 may be directly communicatively coupled to movable component 18 and movable component 20.

Electronic data storage unit 26 may comprise any type of data storage component including, without limitation, non-volatile memory, disk drives, tape drives, and mass storage devices and may include any suitable software, algorithms and/or sub-routines that provide the data storage component with the capability to store, organize, and permit retrieval of data.

In the illustrated embodiment, electronic data storage unit 26 is configured to store a file 30 containing information indicative of and/or relating to the pressure fields that are anticipated to arise (hereafter, "anticipated pressure fields") around aircraft 12 during flight. Such information may include, but is not limited to the pressure gradients that will be encountered in the anticipated pressure fields. This information may be gathered apriori in any suitable manner including, but not limited to, the use of appropriate computational fluid dynamics software, the collection and accumulation of data during testing under actual conditions, combinations thereof, and any other suitable means, whether now known or hereinafter invented and/or developed.

The information relating to the anticipated pressure fields stored in file 30 may correlate with different Mach speeds, different atmospheric conditions, different engine operating conditions, different aircraft states, and/or with other variables as well. For example, file 30 may contain a series of anticipated pressure fields, each one corresponding with a different Mach speed within a range of Mach speeds that aircraft 12 is anticipated to encounter. File 30 may also contain a series of anticipated pressure fields, each one corresponding with different atmospheric conditions that aircraft 12 is anticipated to encounter. File 30, may also contain a series of anticipated pressure fields, each one corresponding with different operating conditions that aircraft 12 is anticipated to encounter. File 30 may also contain a series of anticipated pressure fields reflective of the pressure fields that are expected to develop around aircraft 12 as each of the Mach speed, the atmospheric conditions, and the operating conditions of aircraft 12 are varied in combination. In this manner, file 30 may contain anticipated pressure fields that correspond with substantially all combinations of Mach speed, atmospheric conditions, and operating conditions that aircraft 12 is anticipated to encounter.

Controller 28 is communicatively coupled with electronic data storage unit 26. Through this communicative coupling, controller 28 has access to file 30. Configured in this manner, controller 28 will have access to, and can select anticipated pressure fields that correspond with the atmospheric conditions, operating conditions, and Mach speed encountered by aircraft 12 and controller 28 may use those anticipated pressure fields as a basis for comparison with the pressure field detected by plurality 14 of pressure sensors 16, as discussed in greater detail below.

Electronic data storage unit 26 may be further configured to store a file 32 containing information indicative of the effect that movable component 18 will have on the pressure field around aircraft 12 when it is moved. File 32 may also contain information indicative of the extent of that effect in correlation to the extent that movable component 18 is moved. File 32 may also contain information that correlates the effect of such movement on the pressure field, and the extent of the effect corresponding to the extent of the movement, with the various Mach speeds, operating conditions, and atmospheric conditions that aircraft 12 is anticipated to encounter. For example, file 32 may contain information indicative of how the movement and the extent of the movement of movable component 18 will affect the pressure field at the different Mach speeds that fall within the range of Mach speeds that aircraft 12 is anticipated to encounter. Similarly, file 32 may contain information indicative of how the movement, and the extent of the movement, of movable component 18 will affect the pressure field at different atmospheric conditions that fall within the range of atmospheric conditions that aircraft 12 is anticipated to encounter. Further, file 32 may contain information indicative of how the movement and the extent of the movement of movable component 18 will affect the pressure field at each of the different operating conditions that fall within the range of operating conditions that aircraft 12 is anticipated to encounter. File 32 may further contain information indicative of how the movement and the extent of the movement of movable component 18 will affect the pressure field in various circumstances where the Mach speed, the atmospheric conditions and the operating conditions all deviate in anticipated manners from the design conditions.

In embodiments having more than two or more movable components, electronic data storage unit 26 may be configured to store a plurality of files 32, each containing information indicative of the effect that each additional movable component will have on the pressure filed around aircraft 12 as it is moved in the various conditions and operating states that aircraft 12 is anticipated to encounter. Configured in this manner, controller 28 will have access to a plurality of files 32 containing information that will allow controller 28 to determine which movable component or movable components should be moved to counteract or offset the propulsion system's effect on the pressure field around aircraft 12 and to what extent controller 28 should move said movable component(s).

In some embodiments, electronic data storage unit 26 may store a file 34 containing information indicative of the thresholds and/or limitations for the pressure field around aircraft 12 that are applicable to the different jurisdictions through which aircraft 12 may be flying. For example, electronic data storage unit 26 may contain a file 34 for each of the jurisdictions identified in a flight plan, for each jurisdiction that aircraft 12 has previously flown to or through, and/or for each jurisdiction throughout the world that has restrictions on the magnitude of a sonic boom generated by aircraft during supersonic flight. Configured in this manner, controller 28 will have access to file 34, and therefore, will have access to information that will allow controller 28 to determine when corrective measures should be taken to offset the effect of the aircraft's propulsion system on the pressure field around aircraft 12.

Controller 28 may be any type of computer, controller, micro-controller, circuitry, chipset, computer system, or microprocessor that is configured to perform algorithms, to execute software applications, to execute sub-routines and/or to be loaded with and to execute any other type of computer program. Controller 28 may comprise a single processor or a plurality of processors acting in concert. In some embodiments, controller 28 may be dedicated for use exclusively with system 10 while in other embodiments controller 28 may be shared with other systems on board aircraft 12.

In the illustrated embodiment, controller 28 is communicatively coupled with plurality 14 of pressure sensors 16, with primary controllers 22 and 24, and with electronic data storage unit 26. Controller 28 is communicatively connected to movable components 18 and 20 through primary controllers 22 and 24. These communicative couplings/connections may be accomplished through the use of any suitable means of transmission including both wired and wireless connections. For example, each component may be physically connected to controller 28 via a coaxial cable or via any other type of wire connection that is effective to convey signals. In other embodiments, each component may be communicatively connected to controller 28 across a communication bus. In still other examples, each component may be wirelessly connected to controller 28 via a BLUETOOTH connection, a WIFI connection or the like.

Being communicatively coupled and/or connected with each of the components identified above provides a pathway for the transmission of commands, instructions, interrogations and other signals between controller 28 and each of the other components. The plurality 14 of pressure sensors 16, the primary controllers 22 and 24, and the electronic data storage unit 26 are each configured to interface and engage with controller 28. For example, pressure sensors 16 are each configured to provide information to controller 28 indicative of their respective pressure readings and controller 28 is configured to receive such pressure readings. Primary controllers 22 and 24 are each configured to send and receive communications and/or instructions from controller 28 and controller 28 is configured to send and receive communications from primary controllers 22 and 24. Electronic data storage unit 26 is configured to receive communications, interrogations, and instructions from, and to provide information to, controller 28 and controller 28 is configured to send communications, interrogations, and instructions to, and to receive information from, electronic data storage unit 26. In embodiments where controller 28 is directly communicatively coupled with movable components 18 and 20, movable components 18 and 20 are configured to receive and respond to communications, instructions, and commands issued by controller 28 and controller 28 is configured to communicate with, and to issue instructions to movable components 18 and 20 and to receive communications from movable components 18 and 20.

Controller 28 is configured to interact with, coordinate and/or orchestrate the activities of each of the other components of system 10 for the purpose of controlling the pressure field that forms around aircraft 12 in flight. In a non-limiting example, controller 28 is configured to receive pressure readings from each pressure sensor 16. In an embodiment, controller 28 will be programed with, or will otherwise have access to information indicative of where each pressure sensor 16 is located with respect to an exterior surface of aircraft 12. Using the location information and the pressure readings provided by each pressure sensor 16, controller 28 is configured to calculate the pressure field around aircraft 12. In an embodiment, controller 28 will have access to information indicative of the prevailing atmospheric conditions, the current Mach speed of aircraft 12, and the current operating conditions of aircraft 12. Controller 28 may obtain this information by communicating with other systems onboard aircraft 12 including, but not limited to, wireless transmitters, instrument panel gages, flight control computers, and the like.

Using the current Mach speed and the current operating conditions of aircraft 12, and using the prevailing atmospheric conditions in the vicinity of aircraft 12, controller 28 is configured to communicate with electronic data storage unit 26 to obtain an anticipated pressure field that corresponds with the Mach speed of aircraft 12, the current operating conditions of aircraft 12, and the prevailing atmospheric conditions encountered by, or in the vicinity of, aircraft 12. Controller 28 is further configured to compare the anticipated pressure field obtained from electronic data storage unit 26 with the pressure field that it has calculated from the pressure readings provided by plurality 14 of pressure sensors 16. As part of the comparison, controller 28 may be programmed to identify deviations between the pressure gradients predicted in the anticipated pressure field with the pressure gradients that controller 28 detects during its calculation of the pressure field. In other embodiments, controller 28 may be configured to use any suitable metric, either in addition to, or instead of, the anticipated pressure gradients and the detected pressure gradients when comparing the anticipated pressure field with the pressure field calculated by controller 28. In instances where a deviation is detected that does not coincide with the movement of a movable component, the deviation may be caused by the interaction between the propulsion system of aircraft 12 and the free stream of air flowing over aircraft 12.

In some embodiments, controller 28 may be configured to automatically take corrective measures when it detects the occurrence of any deviation between the anticipated pressure field and the pressure field that controller 28 calculates. In other embodiments, controller 28 may be configured to assess the deviation and only take corrective measures when the deviation exceeds a predetermined magnitude or threshold. In some examples, that predetermined magnitude may be programmed directly into controller 28. In other examples, controller 28 may be configured to obtain information from electronic data storage unit 26 that is indicative of acceptable deviations between the pressure field and the anticipated pressure field. In some embodiments, controller 28 may access file 32 to obtain this information. In some examples, such information may correspond with the jurisdiction that aircraft 12 is flying over.

Once controller 28 has determined that the deviation between the pressure field and the anticipated pressure field requires corrective measures, controller 28 is configured to obtain information relating to movable components 18 and 20. This information relates to the effect that movement of each movable component will have on the pressure field. In some embodiments, controller 28 will access file 32 to obtain this information. In other embodiments, such information may be programmed into controller 28 or be available from some other source accessible to controller 28. Using this information, controller 28 can determine which component to move and to what extent it should be moved in order to reduce the deviation between the anticipated pressure field and the pressure field that controller 28 has calculated.

For example, controller 28 may obtain information indicative of the effects on the pressure field of changing the engine cycle of the gas turbine engine of the propulsion system while flying at the current Mach speed, operating conditions, and prevailing atmospheric conditions. Controller 28 may also obtain information about the effects on the pressure field of moving the propulsion system's compression surface fore or aft while flying at the current Mach speed, operating conditions, and prevailing atmospheric conditions. Controller 28 may also obtain information about the effects on the pressure field of deflecting the ailerons of aircraft 12 up or down while flying at the current Mach speed, operating conditions, and prevailing atmospheric conditions. Controller 28 may obtain similar information relating to all movable components of system 10.

Using this information, controller 28 can determine which movable component to move in order to most advantageously reduce or entirely offset the deviation that controller 28 detected between the pressure field and the anticipated pressure field. Controller 28 may use other information as well when making this determination. For example, and without limitation, controller 28 may also take into consideration the effect on drag, the effect on the speed, the effect on fuel consumption, and any other suitable factor that may be impacted by movement of the movable component. For example, moving a control surface may have an undesirable effect on the angle of attack of aircraft 12 while changing the engine cycle may have an undesirable effect on the Mach speed of aircraft 12. Controller 28 may be programmed to prioritize the desirability or undesirability of effects such as these and may determine which movable component to move based on which movement will have the least undesirable effect.

Once controller 28 has determined which movable component to move, controller 28 is configured to transmit an instruction to the primary controller associated with that component. In an example where controller 28 has determined that movable component 18 should be moved and has further determined to what extent it should be moved, controller 28 is configured to send an instruction to primary controller 22 to move movable component 18 in the manner, and to the extent, determined by controller 28.

In some embodiments, primary controller 22 will comply with the instruction provided by controller 28 and will command movable component 18 to move in the manner determined by controller 28. In other embodiments, primary controller 22 will be configured to evaluate the command provided by controller 28 for compatibility with restrictions and limitations that govern the control that primary controller 22 exercises over movable component 18. If the command is found to be compatible with the restrictions and limitations programmed into primary controller 22, then primary controller 22 will send the command to movable component 18. However, in instances where the movement commanded by controller 28 is not compatible with the restrictions and limitations programmed into primary controller 22, primary controller 22 will not comply with the command. In instances where the command is only partially compatible with the restrictions and limitations programmed into primary controller 22, primary controller 22 will modify the command to provide partial compliance. In instances where primary controller 22 fully complies with the command, primary controller 22 may be configured to send a message to controller 28 communicating its compliance with the command. In instances where primary controller 22 determines that compliance with the command is not appropriate, primary controller 22 may be configured to ignore the command and communicate its rejection of the command to controller 28. Similarly, in instances where primary controller 22 determines that only partial compliance with the command is appropriate, primary controller 22 may communicate its partial compliance to controller 28.

After controller 28 has provided the command to primary controller 22, controller 28 will continue to monitor the pressure field around aircraft 12 and compare it with the anticipated pressure field. If the deviation between the pressure field and the anticipated pressure field dissipates, then no further action by controller 28 may be needed. In instances where the deviation does not diminish or does not diminish sufficiently, or in instance where controller 28 receives a communication from primary controller 22 indicative of non-compliance or of only partial compliance, controller 28 may be configured to engage in further analysis to determine if alternate or further corrective measures are appropriate. In some instances, when the deviation does not sufficiently diminish, controller 28 may modify the original command to obtain further movement of movable component 18. In other instances, controller 28 may determine that movement of movable component 20 may be necessary. In still other instances, such as when controller 28 receives a communication from primary controller 22 that compliance with the command will not be forthcoming or that only partial compliance will be provided, then controller 28 may provide a command to primary controller 24 seeking movement of movable component 20. Primary controller 24 may be configured to either comply with the command or to engage in an analysis to determine whether the command is compatible with restrictions and limitations programmed into primary controller 24. After engaging in the analysis, primary controller 24 may fully comply with the command issued by controller 28 or it may only partially comply with the command or it may reject the command altogether. Primary controller 24 may be further configured to send a message to controller 28 indicative of its full compliance, partial compliance, or non-compliance, as appropriate.

After issuing the command, controller 28 will further monitor the pressure field to determine whether the deviation dissipates or sufficiently diminishes. If so, then controller 28 will take no further action other than to continue its monitoring of the pressure field. If the deviation does not dissipate, the analysis described above will repeat and controller 28 will determine how and whether to take action to reduce the deviation. In some embodiments, the above described sampling, analysis, determination, issuance of commands, compliance with commands, and further monitoring of the pressure field around aircraft 12 may be performed automatically by system 10 without aircrew intervention, involvement, and/or awareness.

FIGS. 2-6 depict aircraft 12 equipped with system 10 (see FIG. 1) during flight operations and further depict the stages of monitoring a pressure field 36 around aircraft 12, determining the existence of a deviation between pressure field 36 and the anticipated pressure field, and the corrective measures implemented by system 10. In the embodiments illustrated in FIGS. 2-6, pressure field 36 has been illustrated through the use of multiple double headed arrows situated around aircraft 12.

Figure 2:
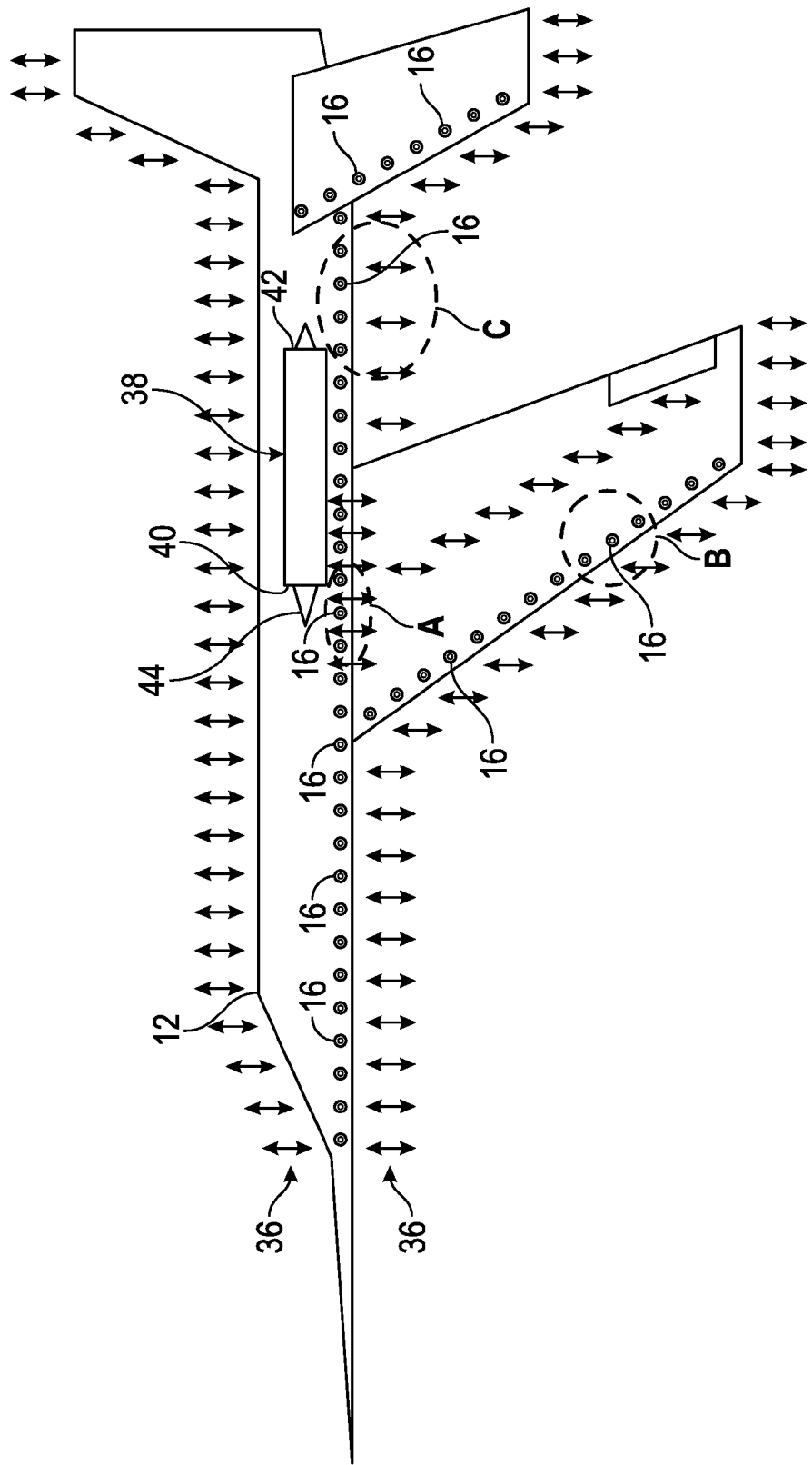
FIG. 2 is a schematic view illustrating an aircraft in flight equipped with the system of FIG. 1 and showing the pressure field around the aircraft.

With respect to FIG. 2, aircraft 12 is equipped with a propulsion system 38 comprising a gas turbine engine (not shown), an inlet 40 and a nozzle 42. Inlet 40 includes an extendable compression surface 44 configured for movement between a retracted position and an extended position. Extendable compression surface 44 is illustrated in FIG. 2 in its retracted position.

Aircraft 12 further includes a plurality of pressure sensors 16 to detect and measure pressure field 36. In the illustrated embodiment, aircraft 12 is configured with a large number of pressure sensors 16 arranged in a substantially equidistant pattern along substantially an entire length of the exterior of aircraft 12. For ease of illustration, only small portion of the pressure sensors have been identified with the reference numeral 16. In other embodiments, pressure sensors 16 may be arranged in any other suitable manner. For example, in other embodiments, pressure sensors 16 may be concentrated in areas where interaction between propulsion system 38 and pressure field 36 is known to occur. In still other embodiments, pressure sensors 16 may be disposed only in areas where interaction between the propulsion system and the pressure field are known to occur.

In the embodiment illustrated in FIG. 2, several pressure sensors 16 have been circled and identified with reference letters. These pressure sensors 16 have been arranged in locations where adverse interaction between propulsion system 38 and pressure field 36 are anticipated. For example, the pressure sensors 16 identified with the reference letter A are disposed in a region proximate inlet 40. The pressure sensors 16 identified with the references letter B are disposed in a region where a shock formed by the cowl lip of the propulsion system's nacelle is expected to intersect with the surface of aircraft 12. The pressure sensors 16 identified with the reference letter C are disposed in a region proximate nozzle 42. Arranged in this manner, any substantial change in pressure from one pressure sensor 16 to another pressure sensor 16 proximate propulsion system 38 will be detected.

Figure 3:
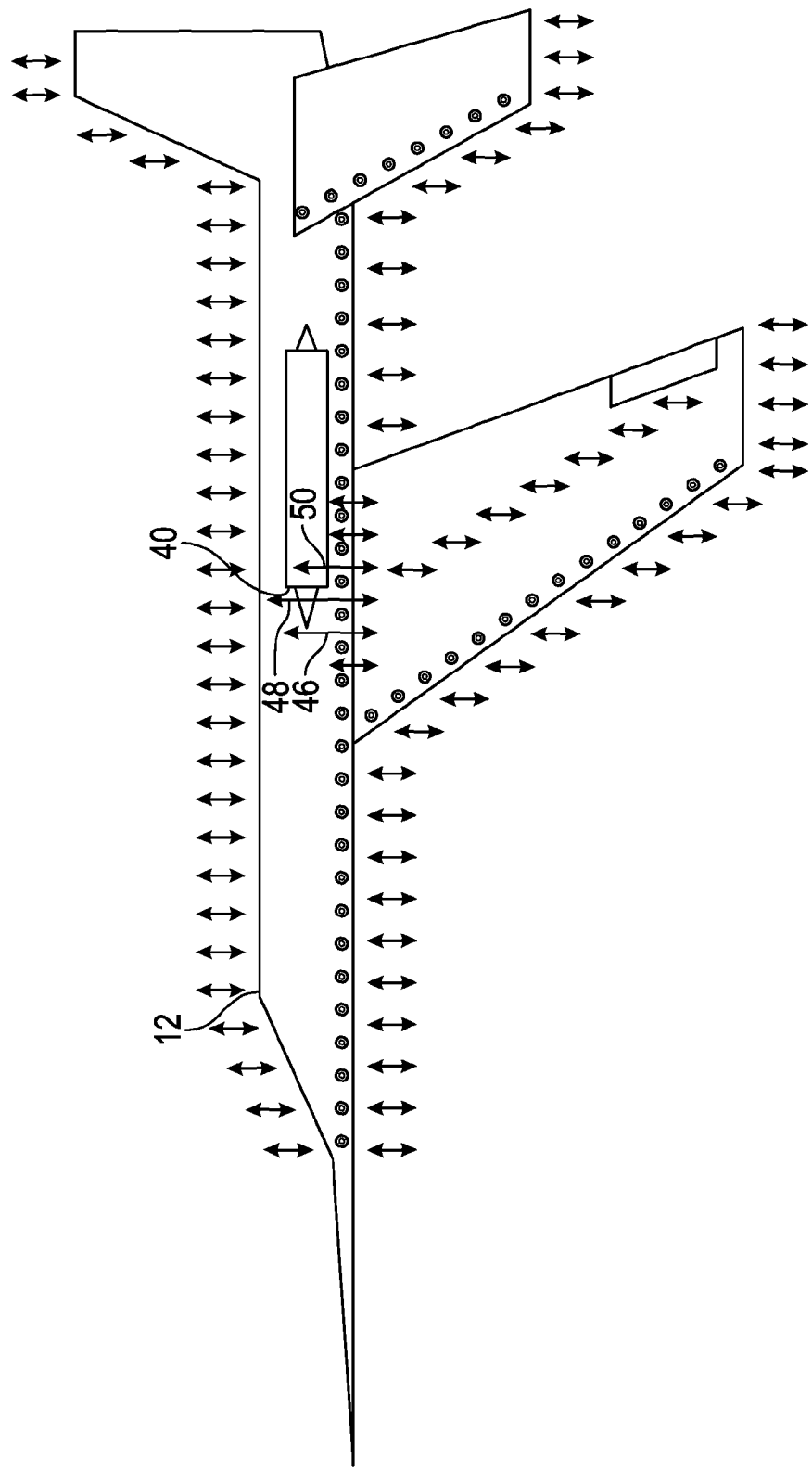
FIG. 3 is a schematic view illustrating the aircraft of FIG. 2 as it experiences a disturbance in the pressure field.

With continuing reference to FIGS. 1-2, FIG. 3 depicts a condition where a steep pressure gradient has formed proximate inlet 40. The steep pressure gradient is depicted through the use of elongated double headed arrows 46, 48, and 50, which are representative of elevated static pressure detected by pressure sensors 16 in the vicinity of inlet 40. Controller 28 will receive information indicative of this steep pressure gradient from pressure sensors 16 in the region identified with the reference letter A illustrated in FIG. 2. In the illustrated embodiment, controller 28 will determine that this steep pressure gradient is inconsistent with the pressure gradient of an anticipated pressure field associated with the current Mach speed, prevailing atmospheric conditions, and current operating conditions of aircraft 12. Controller 28 may make this determination by accessing file 30 stored in electronic data storage unit 26. In some embodiments, controller 28 may evaluate whether the inconsistency between the detected pressure gradient and the anticipated pressure gradient exceeds a predetermined threshold in order to determine whether corrective measures are needed. Controller 28 may make this determination by accessing file 34 stored in electronic data storage unit 26. In the illustrated embodiment, controller 28 determines that corrective measures are needed.

Figure 4:
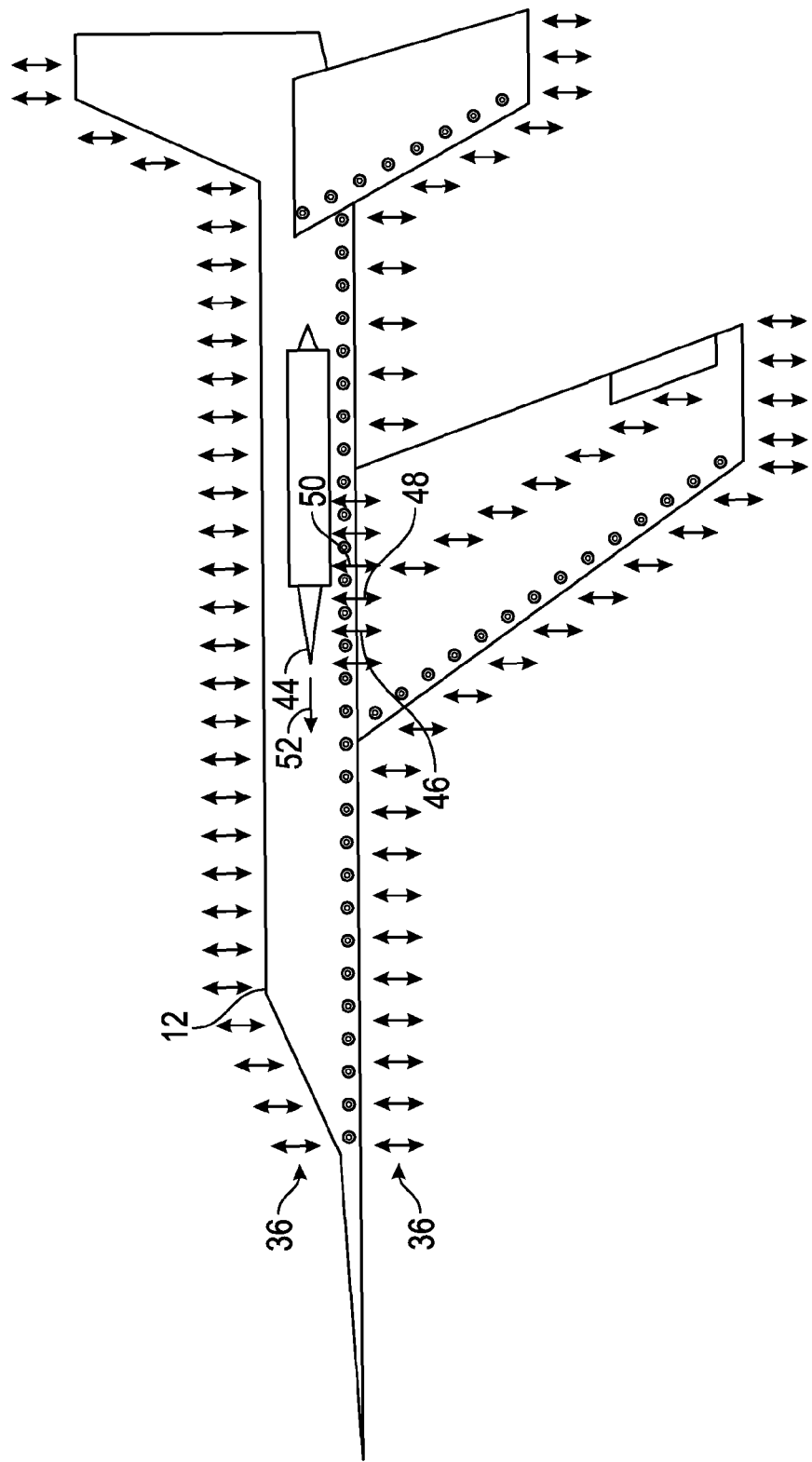
FIG. 4 is a schematic view illustrating the aircraft of FIG. 3 after a component has been moved which quells the disturbance in the pressure field.

With respect to FIG. 4, and with continuing reference to FIGS. 1-3, controller 28 has sent a command to the primary controller associated with extendable compression surface 44 instructing the primary controller to extend extendable compression surface 44 by an amount determined by controller 28 to be necessary to offset the steep pressure gradient. Controller 28 may have determined which movable component to move and the amount of movement needed to diminish the deviation between the pressure field and the anticipated pressure field by accessing file 32 in electronic data storage unit 26. In the scenario illustrated in FIG. 4, the primary controller associated with extendable compression surface 44 has determined that the command given by controller 28 is compatible with the limitations and restrictions that govern the primary controller and has forwarded the command to move to extendable compression surface 44. As a result, extendable compression surface 44 has moved in the direction indicated by arrow 52 to an extended position. Because of this movement of extendable compression surface 44, the steep pressure gradient detected in FIG. 3 has diminished as indicated by the diminution of arrows 46, 48, and 50 in FIG. 4. As a result, the deviation between pressure field 36 and the anticipated pressure field has diminished and pressure field 36 has returned to a pressure field that will not give rise to a sonic boom that will exceed applicable restrictions.

Figure 5:
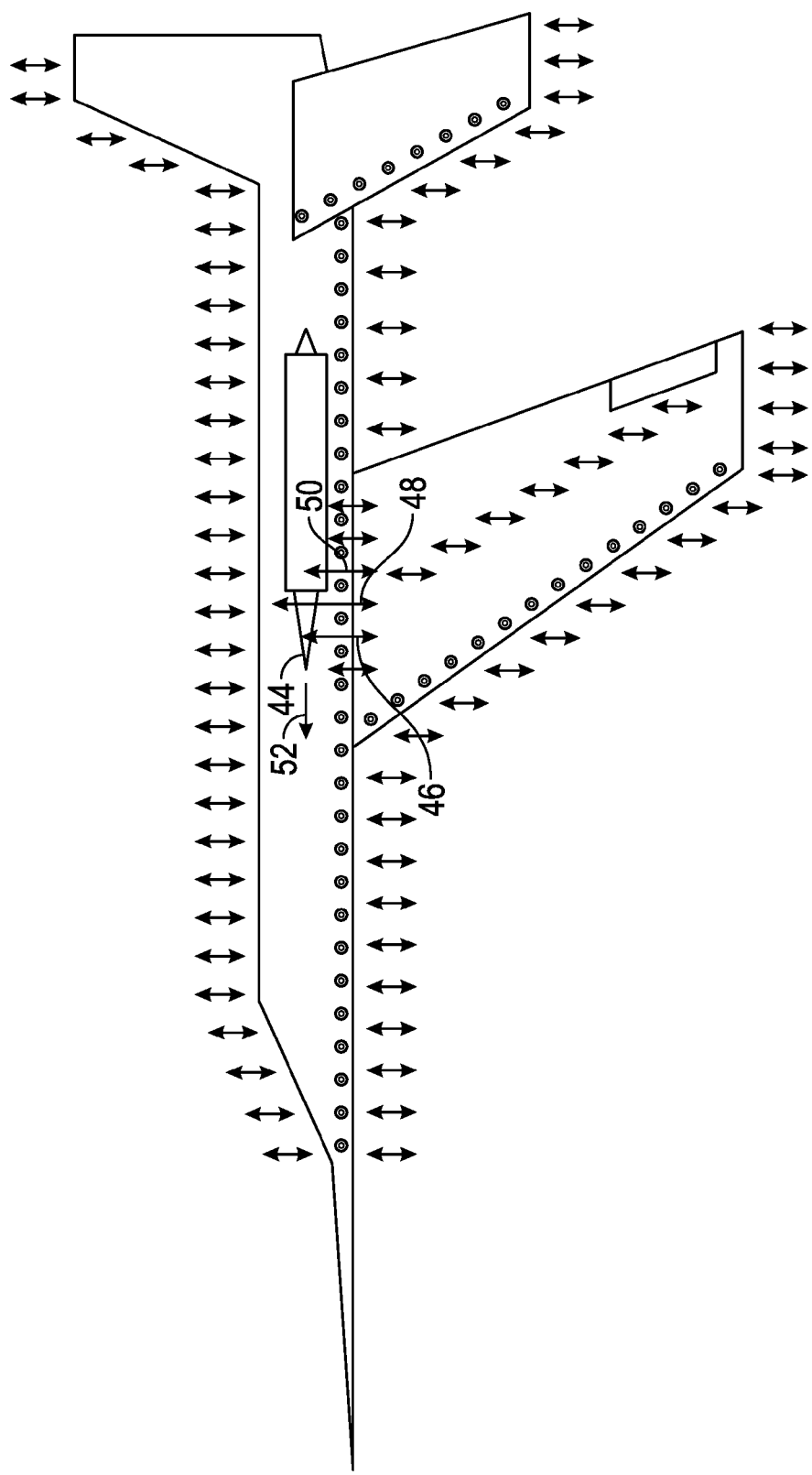
FIG. 5 is a schematic view illustrating the aircraft of FIG. 3 after a first component has been moved which partially quells the disturbance in the pressure field.
Figure 6:
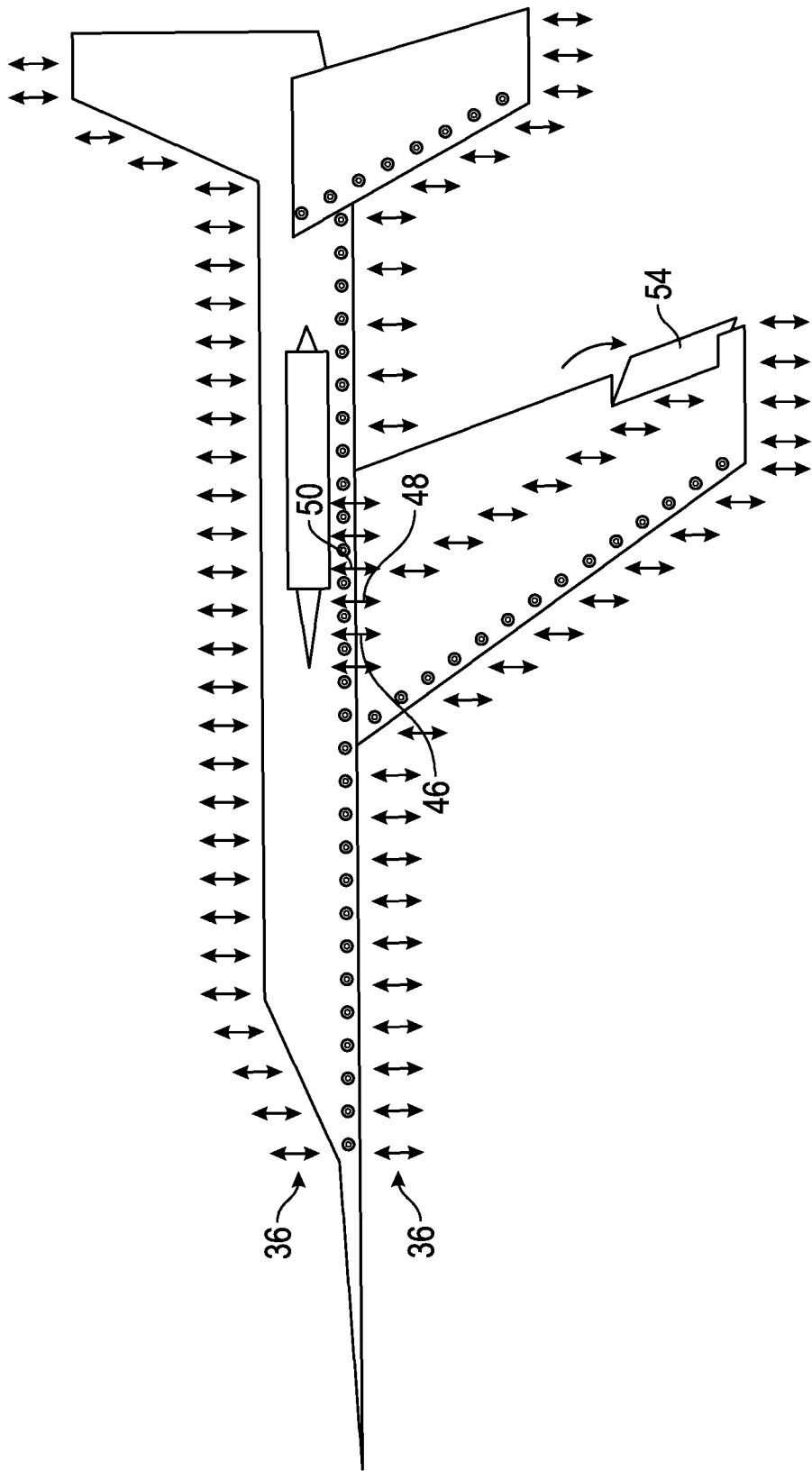
FIG. 6 is a schematic view illustrating the aircraft of FIG. 3 after a second component has been moved to cooperate with the first component and completely quell the disturbance in the pressure field.

An alternate scenario is illustrated in FIGS. 5 and 6. With continuing reference to FIGS. 1-4, in FIG. 5, extendable compression surface 44 has been moved to the extended position illustrated in FIG. 4, but the steep pressure gradient illustrated by arrows 46, 48, and 50 has not diminished to an acceptable level. Through continued monitoring of pressure field 36, controller 28 detects the continued existence of a steep pressure gradient and determines that further action is needed.

In FIG. 6, controller 28 determines that an appropriate action to further reduce the steep pressure gradient would be to move aileron 54. Controller 28 may have made this determination by accessing file 32 in electronic data storage unit 26. Controller 28 sends a command to the primary controller associated with aileron 54 requesting that aileron 54 be deflected in a downward direction to a specified angle.

In the scenario illustrated in FIG. 6, the primary controller associated with aileron 54 has determined that the command given by controller 28 is compatible with the limitations and restrictions that govern the primary controller and has forwarded the deflection command to aileron 54. As a result, aileron 54 has deflected downward in the manner illustrated in FIG. 6. This movement of aileron 54, in combination with the movement of extendable compression surface 44 causes the steep pressure gradient detected in FIG. 5 to diminish as indicated by the diminution of arrows 46, 48, and 50. As a result, the deviation between pressure field 36 and the anticipated pressure field has diminished and pressure field 36 has returned to a pressure field that will not give rise to a sonic boom that will exceed applicable restrictions.

Figure 7:
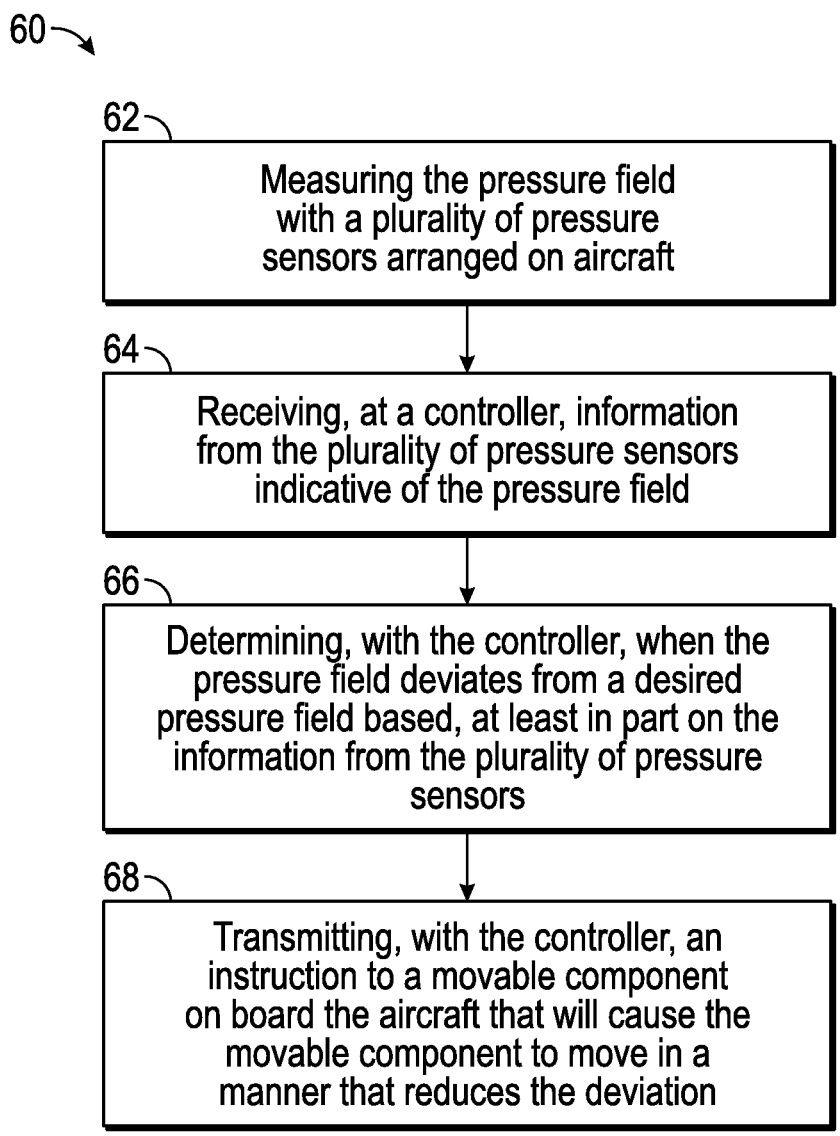
FIG. 7 is a flow chart depicting a non-limiting embodiment of a method for controlling the pressure field around an aircraft in flight.

FIG. 7 illustrates a non-limiting embodiment of a method 60 for controlling a pressure field around an aircraft.

At step 62, a pressure field around an aircraft is measured using a plurality of pressure sensors. In some embodiments, the plurality of pressure sensors may be arranged along an exterior surface of the aircraft where they can directly sample the free stream of air flowing over the aircraft's surface. In other embodiments, the pressure sensors may be located inside of the aircraft and may use optical means to take pressure measurements. The pressure sensors may be arranged in any suitable manner including, but not limited to, a substantially even distribution along the airframe or a concentrated arrangement in regions of the aircraft known or expected to experience steep pressure gradients.

At step 64, a controller on board the aircraft receives information from each of the pressure sensors indicative of the pressure readings taken by the pressure sensors.

At step 66, the controller determines when the pressure field deviates from a desired pressure field based, at least in part, on the information received from the plurality of pressure sensors. The controller may also utilize information pertaining to the aircraft's Mach speed, the prevailing atmospheric conditions, and the operating conditions of the aircraft. The controller may also use information stored in an electronic data storage unit indicative of an anticipated pressure field. In some embodiments of method 60, the controller may also determine whether corrective measures are needed to reduce the deviation.

At step 68, the controller transmits an instruction to a movable component onboard the aircraft to move in a specified manner that is anticipated to cause a reduction in the deviation between the pressure field and the anticipated pressure field. In some embodiments, the controller may transmit the command to an intermediate primary controller that is configured to control movement of the movable component. In some embodiments, further monitoring by the controller may occur followed by the transmission of further commands to move the movable component further or to move other movable components on board the aircraft. This step may be repeated until the deviation diminishes completely or diminishes to a level below a predetermined threshold.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A system for controlling a pressure field around an aircraft in flight, the system comprising:
    a plurality of pressure sensors arranged at a plurality of locations extending along an external surface of the aircraft, each pressure sensor configured to measure a respective local pressure;
    a primary controller configured to control movement of a movable component onboard the aircraft; and
    a controller communicatively coupled with the plurality of pressure sensors, the controller configured to receive information indicative of the-respective local pressure from each pressure sensor and to compile each respective local pressure to determine the pressure field along the external surface of the aircraft, to determine when the pressure field deviates from a desired pressure field based on the information, and to transmit a request to the primary controller to move the movable component in a manner that reduces the deviation, and wherein the primary controller is further configured to evaluate the request and to comply with the request only when the request does not conflict with a control law governing the primary controller.

2. The system of claim 1, wherein the movable component comprises a propulsion system component.

3. The system of claim 1, wherein the movable component comprises a flight control surface.

4. The system of claim 1, wherein the pressure field deviates from the desired pressure field when a pressure gradient of the pressure field exceeds a pressure gradient of the desired pressure field.

5. A system for controlling a pressure field around an aircraft in flight, the system comprising:
    a plurality of pressure sensors arranged at a plurality of locations extending along an external surface on the aircraft, each pressure sensor of the plurality of pressure sensors positioned to measure a respective local air pressure proximate a respective portion of an external surface of the aircraft proximate a propulsion system of the aircraft;
    a first movable component mounted on the aircraft and disposed in a position that alters the pressure field when the first movable component moves while the aircraft is in flight;
    a first primary controller operatively coupled with the first movable component and configured to control movement of the first movable component; and
    a controller communicatively coupled with the plurality of pressure sensors and communicatively coupled with the first primary controller, the controller configured to receive information from each pressure sensor indicative of the respective local air pressure and to compile each respective local air pressure to compute the pressure field along the external surface of the aircraft based on the information, to detect a deviation between the pressure field and an anticipated pressure field caused by the propulsion system of the aircraft, and to send a first request to the first primary controller to move the first movable component in a manner that diminishes the deviation when the deviation is detected, and wherein the first primary controller is further configured to evaluate the first request and to comply with the first request only when the first request does not conflict with a control law governing the first primary controller.

6. The system of claim 5, wherein the first movable component comprises a flight control surface.

7. The system of claim 5, wherein the first movable component comprises a propulsion system component.

8. The system of claim 5, wherein detecting the deviation comprises comparing a pressure gradient of the pressure field with a corresponding pressure gradient of the anticipated pressure field.

9. The system of claim 5, wherein the controller is further configured to send the first instruction when the deviation exceeds a predetermined deviation.

10. The system of claim 5, further comprising a second movable component mounted on the aircraft and disposed in a second position that alters the pressure field when the second movable component moves while the aircraft is in flight, and still further comprising a second primary controller operatively coupled with the second movable component and configured to control movement of the second movable component,
wherein the controller is communicatively coupled with the second primary controller and configured to transmit a second request to the second primary controller to move the second movable component in a manner that diminishes the deviation when the deviation is detected and wherein the second primary controller is further configured to evaluate the second request and to comply with the second request only when the second request does not conflict with a control law governing the second primary controller.

11. The system of claim 10, wherein the controller is further configured to send the second request when movement of the first movable component fails to diminish the deviation by a predetermined amount.

12. The system of claim 10, wherein the controller is further configured to send the second request when the first movable component does not move in response to the first request.

13. The system of claim 5, wherein at least one pressure sensor of the plurality of pressure sensors is positioned to measure the respective air pressure proximate a propulsion system inlet.

14. The system of claim 5, wherein at least one pressure sensor of the plurality of pressure sensors is positioned to measure the respective air pressure proximate a propulsion system nozzle.

15. The system of claim 5, wherein at least one pressure sensor of the plurality of pressure sensors is positioned to measure the respective air pressure proximate a portion of the external surface where a shock generated by a structure of the aircraft intercepts the external surface.

16. The system of claim 5, further comprising an electronic data storage unit communicatively coupled with the controller and configured to store information indicative of a plurality of anticipated pressure fields,
wherein the controller is configured to retrieve the information from the electronic data storage unit and to use the information to detect the deviation between the pressure field and the anticipated pressure field.

17. A method for controlling a pressure field around an aircraft in flight, the method comprising:
measuring the pressure field with a plurality of pressure sensors arranged at a plurality of locations extending along an external surface of the aircraft, each pressure sensor configured to measure a respective local pressure;
receiving, at a controller, information from the plurality of pressure sensors indicative of the respective local pressure from each pressure sensor;
compiling each respective local pressure to determine the pressure field along the external surface of the aircraft;
determining, with the controller, when the pressure field deviates from a desired pressure field based, at least in part, on the information from the plurality of pressure sensors;
transmitting, with the controller, a request to a primary controller configured to control movement of a movable component onboard the aircraft the request requesting the primary controller to move the movable component to move in a manner that reduces the deviation;
evaluating the request by the primary controller to ascertain whether the request conflicts with a control law governing the primary controller; and
moving the movable component with the primary controller when the request does not conflict with the control law.

* * * * *